United States Patent
Dickinson et al.

[15] 3,663,196
[45] May 16, 1972

[54] APPARATUS FOR MANUFACTURE OF FLOAT GLASS

[72] Inventors: George Alfred Dickinson; Frank Nixon, both of St. Helens, England

[73] Assignee: Pilkington Brothers Limited, Liverpool, England

[22] Filed: July 28, 1969

[21] Appl. No.: 845,214

[30] Foreign Application Priority Data

Aug. 12, 1968  Great Britain......................38,393/68

[52] U.S. Cl............................................65/182 R, 65/99 A
[51] Int. Cl. .......................................................C03b 18/00
[58] Field of Search ..........................65/99, 182, 99 A, 182 R

[56] References Cited

UNITED STATES PATENTS

| | | | |
|---|---|---|---|
| 3,487,659 | 1/1970 | Ito et al. | 65/182 X |
| 3,528,795 | 9/1970 | Swillinger | 65/182 |

*Primary Examiner*—S. Leon Bashore
*Assistant Examiner*—Robert L. Lindsay, Jr.
*Attorney*—Morrison, Kennedy & Campbell

[57] ABSTRACT

For the manufacture of thick glass by the float process, fenders are provided for defining a channel down the molten metal bath and each fender comprises a hollow channel member having a flat face which is not wetted by molten glass and which face extends downwardly as a foot for immersion in the bath, there being a groove in the foot near the flat face to facilitate heat extraction from that face when cooling fluid is circulated through the fender.

5 Claims, 4 Drawing Figures

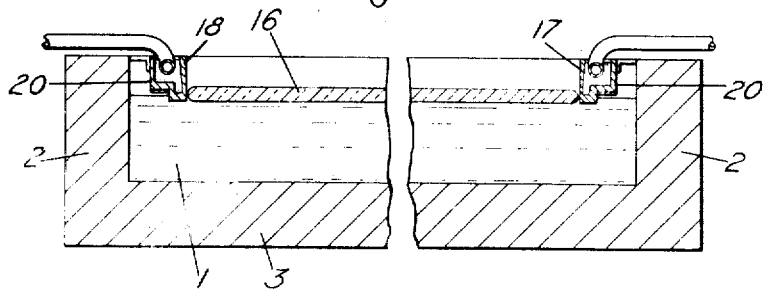
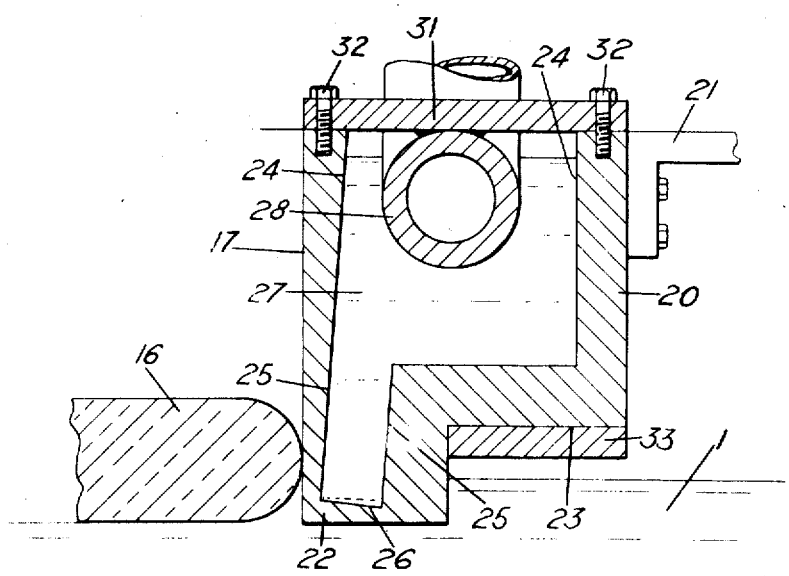

APPARATUS FOR MANUFACTURE OF FLOAT GLASS

BACKGROUND OF THE INVENTION

This invention relates to the manufacture of flat glass on a bath of molten metal, and more especially to the manufacture of float glass of a thickness greater than the thickness achieved by glass which is permitted unhindered lateral flow on the surface of a bath of molten metal to form a ribbon of glass which is advanced on the bath and cooled as it is advanced.

Thick glass, for example from 7 to 15 mm thick, having float characteristics, that is freedom from distortion, flat parallel surfaces and a lustre of fire-finish quality, is manufactured on a bath of molten metal by pouring molten glass at a controlled rate onto the surface of the bath and laterally confining the molten glass on the bath during the initial period of its advance along the bath.

After this initial period of confinement during which the molten glass settles down on the bath surface and achieves a modicum of flatness as well as temperature equalization the molten glass is permitted to flow laterally from the downstream end of the walls confining the molten glass on the bath and when the glass has spread to a desired thickness, the lateral spreading of the glass is physically halted by means of fenders of non-wettable material, e.g. graphite, mounted in the tank structure containing the bath of molten metal and spaced from the side walls of the tank structure so as to define a channel down the bath having a width less than the width of the tank structure at the surface level of the bath, which channel width is specific to the thickness of the glass to be manufactured, and is related to the rate at which molten glass is poured onto the bath surface as well as to the rate of delivery of the ultimate ribbon of glass from the bath.

The edges of the layer of molten glass of predetermined thickness which forms between the spaced fenders glide against the non-wettable surfaces of the fenders. In order to enhance the gliding of the glass against the fenders it is desirable to cool the fenders. The fenders are usually made of carbon in the form of graphite and are cooled by passing a cooling fluid, usually water, through cooling pipes which form an integral part of the fenders. The fenders extend for a distance down the bath sufficient to contain the advancing glass laterally until the glass has been sufficiently stiffened to hold its thickness, by the temperature regulation of the bath which ensures a desired longitudinal viscosity gradient in the ribbon of glass being advanced along the bath. Thereafter the glass is further cooled as it is advanced and ultimately discharged in ribbon form from the bath of molten metal.

The containing of the molten glass, after its lateral flow has been physically halted, between the fenders of non-wettable material permits a further settling of the molten glass on the bath surface when that surface has achieved a desired thickness and has already been subjected to the desirable step of lateral flow of the glass on the molten metal surface.

It is desirable that thermal equalization could be achieved right across the width of the layer of molten glass advancing between the non-wettable surfaces, but some cooling of the edges of the layer of molten glass is a consequence of loss of heat from the edges of the glass to the non-wettable surfaces.

It is the main object of the present invention to provide cooled non-wettable surfaces for engagement by the edges of the advancing layer of molten glass, without extracting so much heat from the bath of molten metal as to upset the thermal equalization achieved in the layer of molten glass of a desired thickness which is settling down between the non-wettable surfaces of the fenders.

SUMMARY

According to the invention therefore there is provided a fender for use in a bath of molten metal for halting the lateral flow of an advancing layer of molten glass established in the bath, comprising a hollow channel member of a material which is not wetted by molten glass, having a flat face engagement by the glass, which face extends downwardly as a foot for immersion in the bath, and wherein the hollow in the fender includes a groove in the foot near to the flat face to facilitate heat extraction from that face when cooling fluid is circulated through the hollow fender.

Preferably the foot extends well below the bottom surface of the channel member, and thermal insulation on the bottom of the channel member minimizes absorption of heat radiated from the surface of the bath of molten metal. Thus the extraction of heat from the molten metal is kept to a minimum which ensures adequate cooling for the flat faces of the fenders.

In another embodiment of the invention the whole of the bottom of the fender is covered with thermal insulation.

Further according to the invention means are provided for circulating cooling fluid through the hollow in the fender. In a preferred embodiment the fender is provided with a pipe for cooling fluid, which pipe fits into the hollow in the fender and is extended as inlet and exhaust pipes for circulation of cooling fluid, and the hollow is filled with molten metal in which the cooling pipe is submerged. Preferably the molten metal is molten tin, and the molten metal greatly enhances transfer of heat from the walls of the fender to the cooling fluid circulating through the cooling pipe.

The invention further comprehends apparatus for use in the manufacture of flat glass by the float process comprising a pair of non-wettable fenders as described above spaced apart in the tank structure containing the bath of molten metal to define a channel down the bath for containing laterally the layer of molten glass being advanced along the bath of molten metal.

The invention further comprehends thick glass, e.g. 7 mm to 30 mm thick, produced using the apparatus as hereinbefore described.

BRIEF DESCRIPTION OF THE DRAWINGS

FIG. 2 is a section on line II—II of FIG. 1, FIG. 3 is an enlarged sectional view of one of the fenders showing the construction of the fender in detail.

DESCRIPTION OF THE PREFERRED EMBODIMENTS

Figure 1:
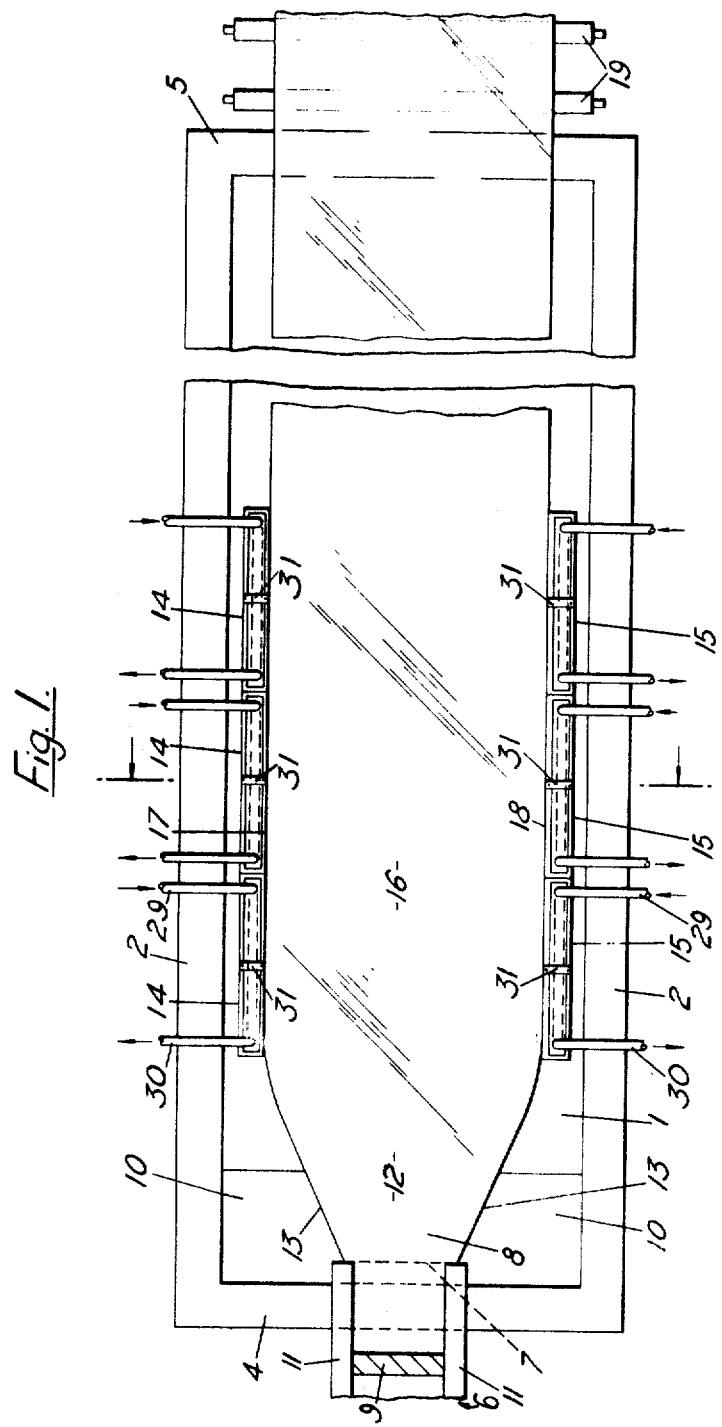
FIG. 1 is a plan view of a tank structure containing a bath of molten metal for use in the float process for the manufacture of flat glass, the roof structure over the tank structure being removed to show fenders according to the invention defining a channel down the bath.

Referring to the drawings a bath of molten metal 1 is contained in a tank structure which is an integral refractory structure comprising side walls 2, a floor 3, an end wall 4 at the inlet end of the tank structure and an end wall 5 at the outlet end of the tank structure.

A spout 6 extends from the forehearth of a glass melting furnace over the inlet end wall 4 in known manner in the float process, the lip 7 of the spout is spaced above the surface level of the bath of molten metal so that a flow of molten glass 8 over the spout lip 7 which is regulated by a tweel indicated at 9, ensures a controlled pouring of molten glass onto the surface of the bath 1. Mounted adjacent the inlet end wall 4 of the tank structure there are restricting walls 10 to either side of the spout and in plan acting as extensions of the side jambs 11 of the spout.

The molten glass 12 arriving on the bath is initially contained between the vertical and inwardly facing surfaces 13 of the restricting walls 10. During its initial period of advance between these surfaces 13 the molten glass settles down on the bath surface to achieve a modicum of flatness and parallelism and achieves temperature equalization at the temperature of the molten metal bath. A roof structure is mounted above the tank structure in known manner and is omitted in the drawings for the sake of clarity. The roof structure defines an inlet through which the molten glass 12 advances along the bath and an outlet through which the ultimate ribbon of glass taken from the bath over the end wall 5 of the tank structure. A protective atmosphere is maintained at a plenum in the headspace over the bath and there is outward flow of the protective atmosphere through the inlet and the outlet for the glass.

The molten glass 12 which is settling down on the bath surface as it advances between the inner faces 13 of the restricting walls 10 is at a temperature of about 1,000° C and is thus in a fluid state. When this molten glass reaches the end of the restricting walls 10 it flows freely outwardly thereby achieving float characteristics in that outward lateral flow on the surface of the molten metal bath. The layer of glass initially contained between the restricting walls 10 is thicker than the glass to be produced and the thickness of the advancing body of molten glass is gradually reduced as the outward lateral flow takes place of the molten glass released from the faces 13 of the restricting walls 10. When the glass has achieved a desired thickness its outward lateral flow is physically halted by means of non-wettable fenders forming two series of fenders 14 and 15 extending down the bath and spaced from the side walls 2 of a bath so as to define a channel along which the layer of molten glass is continuously advanced. This layer of molten glass, indicated at 16, has the predetermined thickness for the glass to be produced and the edges of the glass 16 slide against the faces 17 and 18 of the cooled non-wettable material of the fenders 14 and 15. By the time the glass reaches the end of the two series of fenders 14 and 15 its temperature is at about 780° C at which temperature the viscosity of the glass is such that the ribbon of glass holds its form. Thereafter glass of predetermined thickness is further cooled to about 600° C at which temperature it is lifted from the bath surface and discharged through the outlet from the bath over the end wall 5 by conveyor rolls indicated at 19.

Each of the fenders comprises a hollow channel member 20 of graphite (FIG. 3) which has a flat face for engagement by the glass, and is fixed by means of stays 21 to the side wall 2 of the tank structure. The flat face 17 of the fender shown in FIG. 3 extends downwardly as the face of a foot 22 extending downwardly from the bottom surface 23 of the channel member which foot is immersed in the molten metal bath 1.

The ribbon of thick glass 16 floats on the bath, and the depth of submersion of the foot 22 below the molten metal surface is sufficient to provide a margin of safety preventing any possibility of escape of molten glass from the layer 16 beneath the foot 22. The internal hollow 24 extending longitudinally along the fender and forming the channel shape of the fender, includes a groove 25 which slopes downwardly into the foot 22 so that the bottom 26 of the groove 25 is in proximity to the part of the front face 17 of the fender which is contacted by the layer of molten glass. The hollow 24 in the fender is filled with molten tin 27 and a cooling pipe 28 is submerged in the molten tin within the fender. Some of the tin may be frozen near the surface of the pipe 28. The pipe 28 extends right along the fender and as shown in FIG. 1 in which each fender comprises three such hollow channel sections, each section is provided with its own cooling pipe which has an inlet pipe 29 and an exhaust pipe 30.

Each of the cooling pipes 28 has a strap 31 welded to it, which strap is secured to the upper edges of the channel member 20 by bolts 32.

Cooling water is supplied at a controlled rate and temperature through the pipes and the molten tin filling the channel in each fender ensures excellent thermal contact and thermal exchange between the graphite of the fender, itself a good thermal conductor, and the liquid circulating through the cooling pipe.

The presence of the groove 25 extending downwardly in the foot 22 ensures adequate cooling of the face 18 contacted by the glass through the excellent thermal conductivity of the graphite material coupled with the heat conduction through the molten tin to the cooling pipe. This ensures that there is a maximum heat extraction from the flat face 17 engaged by the edge of the molten glass, while the heat extraction from the bath of molten tin 1 is minimal being only that heat which is extracted through the foot 22 dipping into the molten tin.

The bottom surface 23 of the channel member is provided with a refractory facing 33 of a refractory and thermally insulating material for example FIBREFRAX which reduces absorption by the graphite surface 23 of heat radiated from the surface of the bath of molten metal.

Figure 4:
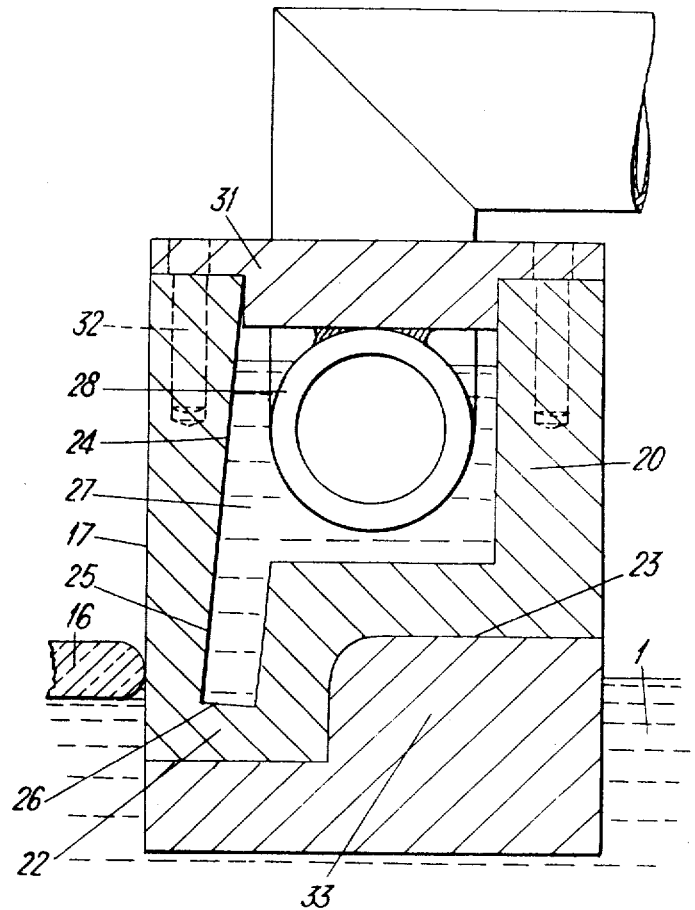
FIG. 4 is a view similar to FIG. 3 of a modified form of fender for defining a channel down the bath.

In another embodiment of the invention, illustrated in FIG. 4, the refractory facing 33 is much deeper and covers the whole of the bottom surface of the fender. This refractory facing is of stepped formation and the facing for the bottom of the foot 22 is thinner than that for the bottom surface 23 of the channel member. The refractory facing 33 dips completely into the molten metal surface and provides thermal insulation for the bottom surface of the channel member as well as the bottom surface of the foot so as to avoid extraction of too much heat from the molten metal.

The two series of fenders 14 and 15 are of identical construction so that at both sides of the tank structure there is adequate cooling of the flat faces 17 and 18 of non-wettable material which are engaged by the edges of the layer of molten glass of predetermined thickness being advanced along the bath thereby ensuring good non-wetting relationship between the edges of the glass and the flat faces of the fenders, while the extraction of heat from the bath of molten metal is symmetrical and is so small as to have no appreciable effect on the pattern of thermal equilibrium achieved in the bath of molten metal; in particular the thermal uniformity achieved across the width of the layer 16 of molten glass being advanced along the bath between the fenders.

The invention thus not only provides for an improvement in the quality of thick glass for example glass of thickness from 7 mm to 30 mm produced by the float process for the manufacture of thick glass, but also enables a high throughput of glass from the plant to be achieved because the localized marginal cooling of the layer of glass enhances the sliding of the edges of the glass over the cooled faces of the fenders and thus makes possible a high ribbon speed without sacrificing any quality in the glass.

We claim:

1. In float glass manufacturing apparatus including a tank structure containing a bath of molten metal, a fender for halting the lateral flow of an advancing layer of molten glass established on the bath and comprising a channel member having a hollow, which channel member is of a material which is not wetted by molten glass and has a bottom surface portion located just above the bath surface, a flat face for engagement by the glass, and a foot extending downwardly into the bath from the unimmersed bottom surface portion of the channel member, which foot has a surface forming a lower portion of said flat face, the hollow of said channel member including an internal groove formed in said foot; said groove extending downwardly within said foot so as to be positioned adjacent the portion of said flat face which is engaged by said glass to facilitate heat extraction from the flat face of the foot, and means for conducting a cooling fluid circulating through the hollow in the fender.

2. Apparatus for use in the manufacture of flat glass by the float process comprising a pair of non-wettable fenders spaced apart in a tank structure containing a bath of molten metal to define a channel down the bath for containing laterally a layer of molten glass being advanced along that bath, each fender comprising a channel member having a hollow which channel member is of a material which is not wetted by molten glass, said channel member having an unimmersed bottom surface portion located just above the bath surface, a flat face positioned for engagement by the glass, and a foot extending downwardly into the bath from said unimmersed bottom surface portion of the channel member, said foot having a surface forming a lower portion of said flat face, the hollow of said channel member including an internal groove formed in said foot; said groove extending downwardly within said foot so as to be positioned adjacent the portion of said flat face which is engaged by said glass to facilitate heat extraction from the flat face of the foot, and means for conducting a cooling fluid circulating through the hollow in the fender.

3. Apparatus according to claim 1, wherein the foot extends well below the unimmersed bottom surface portion of the channel member and the whole of the bottom of the fender is covered with thermal insulation.

4. Apparatus according to claim 1 wherein the hollow is filled with molten metal and said conducting means comprises a pipe for receiving said cooling fluid, which pipe is submerged in said molten metal and is extended so as to define inlet and exhaust pipes for the conduction of said cooling fluid.

5. Apparatus according to claim 1, wherein the foot extends well below the unimmersed bottom surface portion of the channel member and a layer of radiation-absorbant insulation material is provided on the unimmersed bottom surface portion of the channel member to minimize absorption by the fender of heat radiated from the surface of the bath of molten metal beneath the channel member.

* * * * *